(12) United States Patent
Ebert

(10) Patent No.: US 9,187,040 B2
(45) Date of Patent: Nov. 17, 2015

(54) ADJUSTABLE EXTREMELY LARGE MIRROR FOR A VEHICLE

(71) Applicant: William Ebert, Tucson, AZ (US)

(72) Inventor: William Ebert, Tucson, AZ (US)

( * ) Notice: Subject to any disclaimer, the term of this patent is extended or adjusted under 35 U.S.C. 154(b) by 515 days.

(21) Appl. No.: 13/694,414

(22) Filed: Nov. 30, 2012

(65) Prior Publication Data

US 2014/0153125 A1 Jun. 5, 2014

(51) Int. Cl.
*B60R 1/066* (2006.01)
*B60R 1/072* (2006.01)
*G02B 7/183* (2006.01)
*G02B 7/198* (2006.01)
*B60R 1/06* (2006.01)
*B60R 1/062* (2006.01)

(52) U.S. Cl.
CPC .............. *B60R 1/0615* (2013.01); *B60R 1/066* (2013.01); *B60R 1/0625* (2013.01); *B60R 1/072* (2013.01); *G02B 7/183* (2013.01); *G02B 7/198* (2013.01)

(58) Field of Classification Search
CPC .... B60R 1/0615; B60R 1/0625; B60R 1/066; B60R 1/072; G02B 7/183; G02B 7/198
USPC ........................ 359/845, 872, 876, 877, 878
See application file for complete search history.

(56) References Cited

U.S. PATENT DOCUMENTS

| | | | | | |
|---|---|---|---|---|---|
| 2,877,686 | A | * | 3/1959 | Foster | 359/873 |
| 3,075,431 | A | * | 1/1963 | White | 359/873 |
| 3,480,355 | A | * | 11/1969 | Smith | 74/502.1 |
| 3,624,818 | A | * | 11/1971 | Stanfield | 359/878 |
| 3,687,525 | A | * | 8/1972 | Riccio | 359/878 |
| 3,788,734 | A | * | 1/1974 | McDuffee, Sr. | 359/876 |
| 4,190,326 | A | * | 2/1980 | Brodbeck | 359/876 |
| 5,268,796 | A | * | 12/1993 | Tomerlin et al. | 359/871 |
| 5,621,577 | A | * | 4/1997 | Lang et al. | 359/872 |
| 5,687,035 | A | * | 11/1997 | Lang | 359/864 |
| 5,760,980 | A | * | 6/1998 | Lang | 359/872 |
| 8,449,126 | B2 | * | 5/2013 | Ferman et al. | 359/871 |
| 2008/0049343 | A1 | * | 2/2008 | Branham | 359/877 |

* cited by examiner

*Primary Examiner* — Ricky D Shafer
(74) *Attorney, Agent, or Firm* — Mark Ogram

(57) ABSTRACT

The invention is a vehicular mirror assembly for a rectangular shaped mirror typically found on industrial trucks, earthmovers, and dump trucks. The mirror is placed in a holder with two or more pillow block bearings secured on the back of the holder. A circular rod, creating a first axis, extends longitudinally through the pillow block bearings and is swivelly secured to a mounting bracket thereby forming a second axis. A remotely controlled ram is secured to the mounting bracket and proximate to the edge of the holder allowing operator control of the left/right motion around the second axis; a second remotely controlled ram is swivelly secured to the circular rod for up/down adjustment by the operator for movement of the second axis.

18 Claims, 3 Drawing Sheets

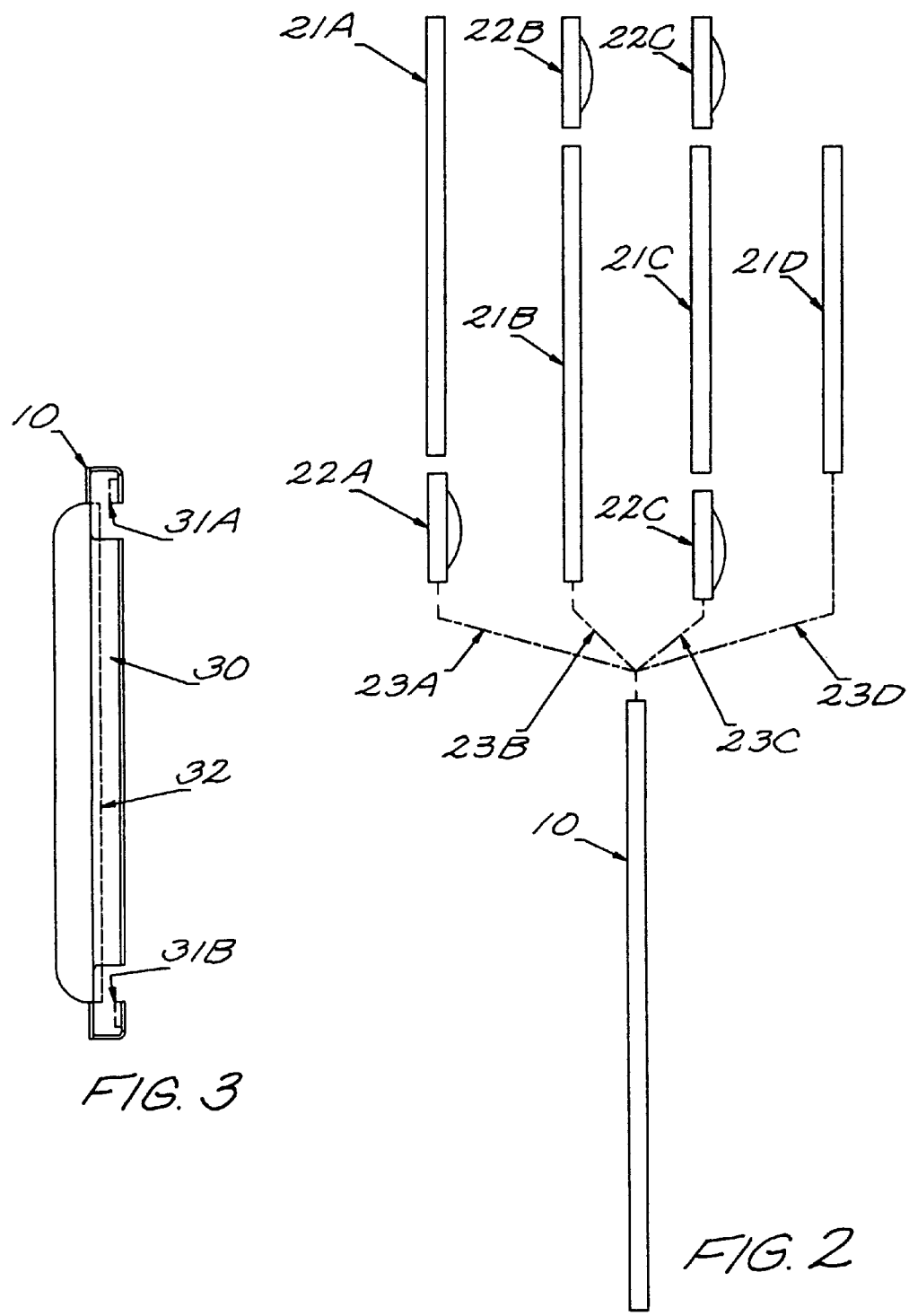

ADJUSTABLE EXTREMELY LARGE MIRROR FOR A VEHICLE

BACKGROUND OF THE INVENTION

This invention relates generally to remotely adjustable mirrors and more particularly to extremely large vehicular mirrors.

Many industrial vehicles, such as: dump trucks, earth movers, excavators, and the like, must employ very large mirrors in order to have a view of their surroundings for safety purposes. These mirrors are often rectangular on the order of four feet high by one foot wide and may be flat or convex.

Due to the economics involved with such large machinery, they are often operated at least two, and usually three, shifts a day. This means that multiple drivers are employed requiring that the mirrors be adjusted for each driver. Manual adjustment of the mirror is difficult and time consuming. The operator/driver must first sit to see how the mirrors are currently adjusted, get up to adjust the mirror, re-seat themselves, and repeat the process if the mirror wasn't properly adjusted. This though becomes burdensome and subsequent drivers often "make do" with the adjustment from the previous driver.

Clearly, by "making do", there are potential blind spots in the mirror's view that can pose significant risks to other vehicles and pedestrians.

Remote control, such as is found in passenger vehicles has not been feasible. The motors, gears, and basic structure used in passenger vehicles does not create a solution for such large and heavy mirrors as is found in the industrial vehicle setting. Because of this, remote control has not been employed, leaving the drivers with only the option of manual manipulation of the mirrors.

It is clear from the foregoing that there is a need for an improved mechanism and mirror which is remotely adjustable.

SUMMARY OF THE INVENTION

The invention is a vehicular mirror assembly for a rectangular shaped mirror typically found on industrial trucks, earthmovers, and dump trucks.

For these large vehicles, the side view mirror is extremely important as the visibility from the cab of the vehicle is already limited due to the size of the vehicle. In the preferred embodiment of the invention, the mirror is placed in a holder with two or more pillow block bearings secured on the back of the holder. The pillow block bearings are extended substantially along the entire length of the mirror's frame in a linear relationship ideally substantially along a center line of the mirror's frame.

A circular rod extends longitudinally through the pillow block bearings and is swivelly secured to a mounting bracket. The circular rod form a first axis used for the rotation of the mirror. The circular rod provides an important mechanism both from the rotational attributes it possesses as well as structural support as will be described later.

Ideally, a horizontal circular rod extends across and is swivelly secured to the back of the mirror. This horizontal circular rod provides for a second axis to the longitudinal circular rod and provides for enhanced securement of the mirror to the mechanism.

When the two circular rods are used, the preferred embodiment utilizes a connecting block through which both circular rods pass. The connecting block in this manner provides for enhanced stabilization between the axis.

The mounting bracket is chosen for the particular vehicle. Brackets to hold the mirror in place on the vehicle are well known in the art and include, but are not limited to: U.S. Pat. No. 8,123,369, entitled "Shaft Structure of Retractable Outer Mirror" issued to Itoh et al. on Feb. 28, 2012, incorporated hereinto by reference.

The mounting bracket forms a platform from which a reference for movement of the mirror's frame is achieved. The mounting bracket is swivelly secured to the circular rod, ideally using another pair of pillow block bearings. This swivel connection forms a second axis which is substantially perpendicular to the first axis.

A remotely controlled ram is secured to the mounting bracket and proximate to the edge of the holder. The remotely controlled ram is positioned such that a portion of the ram passes either directly through the second axis or substantially through the second axis. This remotely controlled ram allows operator control of the left/right motion of the mirror's frame and by extension the mirror.

A second remotely controlled ram is swivelly secured to the circular rod. This second remotely controlled ram allows for up/down adjustment by the operator. As the second ram is extended or withdrawn, the circular rod is pushed/pulled along the length of the mirror's frame so that the force is applied uniformly along the entirety of the mirror's frame.

With the control mechanism for operation of the rams located within the cab of the vehicle, the operator is able to adjust the mirror's angle without having to leave the driver's seat.

Those of ordinary skill in the art readily recognize a variety of control mechanisms which can be utilized in this context, including, but not limited to: U.S. Pat. No. 8,188,989, entitled "Control knob with Multiple Degrees of Freedom and Force Feedback" issued May 29, 2012, to Levin et al.; U.S. Pat. No. 8,138,432, entitled "Electrical Switch Assembly" issued to Larsen et al. on Mar. 20, 2012; both of which are incorporated hereinto by reference.

In some embodiments, the structure is also stabilized using dampeners (acting as shock absorbers) which are positioned to reduce the vibration of the vehicle from being transferred into the mirror's frame.

The mirror's frame itself is structured to allow mirror(s) to be slid or inserted into the frame. This allows for easy replacement of a broken mirror and also permits the operators to choose a configuration which best suits their needs.

As example, in certain situations, a convex mirror is useful for a wider angle and is often used in conjunction with a flat mirror. The different types of mirror, flat and convex, are shaped to be easily inserted into the frame in a variety of configurations.

Forming convex and concave mirrors is well known in the art and include, but is not limited to: U.S. Pat. No. 8,164,817, entitled "Method of Forming a Mirrored Bent Cut Glass Shape for Vehicular Exterior Rearview Mirror Assembly" issued to Varapraisad et al. on Apr. 24, 2012; U.S. Pat. No. 8,157,395, entitled "Folding Outer Mirror" issued to Itoh et al. on Apr. 17, 2012; U.S. Pat. No. 8,147,077, entitled "Exterior Sideview Mirror Assembly" issued to Lynam on Apr. 3, 2012; all of which are incorporated hereinto by reference.

Ideally, a gasket or inflatable gripping arrangement is used to fully secure the mirrors into the frame. In the case of an inflatable grip, the mirrors are first inserted into the frame and then the inflatable grip, an air bladder, is expanded to provide pressure against the mirror to sandwich the mirror with the frame.

The invention, together with various embodiments thereof, will be more fully explained by the accompanying drawings and the following descriptions thereof.

DRAWINGS IN BRIEF

FIG. 2 illustrates the use of different mirror configurations in the present invention.

FIG. 3 illustrates the preferred frame arrangement showing the channel used to receive the mirrors.

DRAWINGS IN DETAIL

Figure 1:
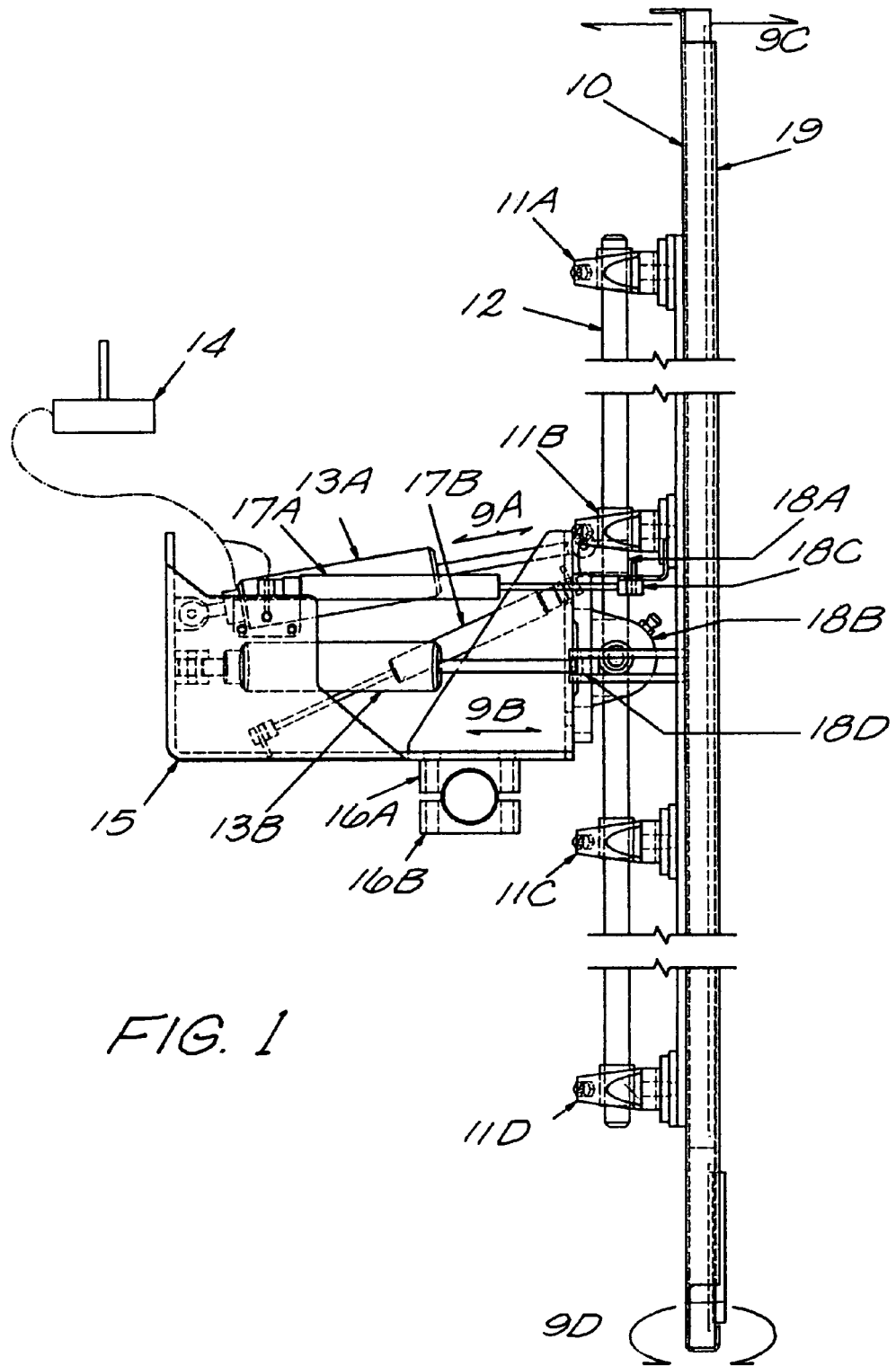
FIG. 1 is a top view of the preferred embodiment of the invention.

FIG. 1 is a top view of the preferred embodiment of the invention.

Pillow block bearings 11A, 11B, 11C and 11D are secured to the back of mirror frame 10 in a linear fashion and accept circular rod 12. Rod 12 forms a first axis allowing mirror 10 to be rotated left/right.

Bracket 15 is secured to circular rod 12 via rotational clamp 18B and to the vehicle (not shown) via clamps 16A and 16B. Rotational clamp 18B creates a second axis which is substantially perpendicular to the first axis form by rod 12. This second axis allows movement as illustrated by arrow 9C, (up/down motion).

While the present figure illustrates the use of bolts to secure bracket 15 to the vehicle, the invention is not limited to this technique alone as those skilled in the art readily recognize a variety of other mechanisms which can be used for this purpose.

Ram 13A is secured at one end to bracket 15 and at the other end to circular rod 12 via rotational clamp 18A. As ram 13A is extended or withdrawn, as illustrated by arrow 9A, movement is created in frame 10 as illustrated by arrow 9C.

To reduce vibrational motion during movement of the vehicle, dampening mechanism 17A (acting as a shock absorber) is secured to bracket 15 and to circular rod 12 via rotational clamp 18C.

Control 14 is used by the operator (not shown) within the cab of the vehicle to adjust the length of ram 13A, and by extension, the position of frame 10 with its attendant mirror.

Frame 10 is configured to accept mirror 19 therein which is used by the operator to view the proximity of the vehicle to obstructions, vehicles and pedestrians.

Ram 13B is controlled by remote 14 (illustrated in FIG. 1A). Ram 13B is connected to bracket 15 as well as a lateral side of frame 10 via swivel connection 18D. Ram 13B is positioned so that it passes either directly through or substantially through the second axis formed by swivel connection 18B.

As ram 13B is extended or withdrawn, as illustrated by arrow 9B, frame 10 is swiveled around circular rod 12 as illustrated by arrow 9D. This motion gives the operator the ability to adjust mirror 19 left/right.

Dampening mechanism 17B, secured to bracket 15 and swivelly connected to frame 10, reduces the amount of "jiggle" or vibration that mirror 19 experiences while the vehicle is in motion.

FIG. 2 illustrates the use of different mirror configurations in the present invention.

In the preferred embodiment, frame 10 is configured to accept a wide variety of mirror configurations. These configurations are created by a selected combination of flat and convex mirrors.

As illustrated, a single flat mirror 21D is able to slip into frame 10 as illustrated by arrow 23D; or as an alternative, a flat mirror 21C with convex mirror 22C at the top and a convex mirror 22C at the bottom is also available to be inserted into frame 10 as illustrated by arrow 23C; or, flat mirror 21B with convex mirror 22B at the top is inserted as illustrated by arrow 23B; or, even, flat mirror 21A with convex mirror 22A at the bottom is inserted into frame 10 as illustrated by arrow 23A.

In this manner, the configuration of the mirrors is chosen to meet the specific needs of the operator for the vehicle.

FIG. 3 illustrates the preferred frame arrangement showing the channel used to receive the mirrors.

Frame 10 has a substantially "U" shaped body with an inner channel 30 into which the mirror assembly (as illustrated in FIG. 2) is inserted. Located at both wings are foam pads 31A and 31B which assist in reducing vibration of the mirror while in frame 10.

In the preferred embodiment, an expandable bladder 32 is also contained with frame 10. In use, once the mirrors are placed within channel 30, inflatable bladder 32 is expanded using air or liquid, to squeeze the mirror between expandable bladder and foam pads 31A and 31B; thereby providing a secure bonding between the mirror assembly and frame 10.

Figure 4A:
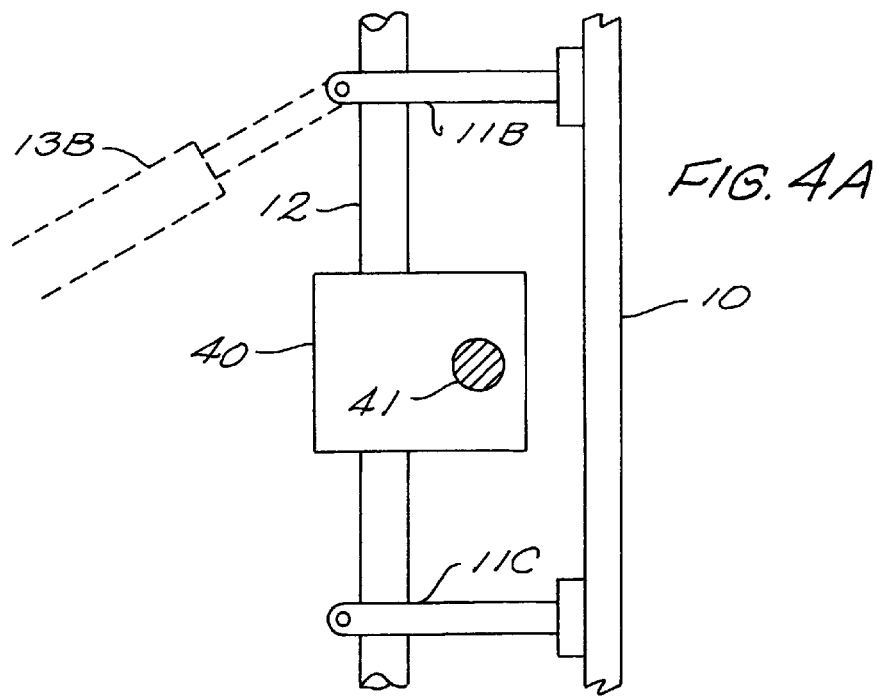
FIGS. 4A and 4B illustrate the preferred connecting block used to secure the lateral and horizontal rods.
Figure 4B:
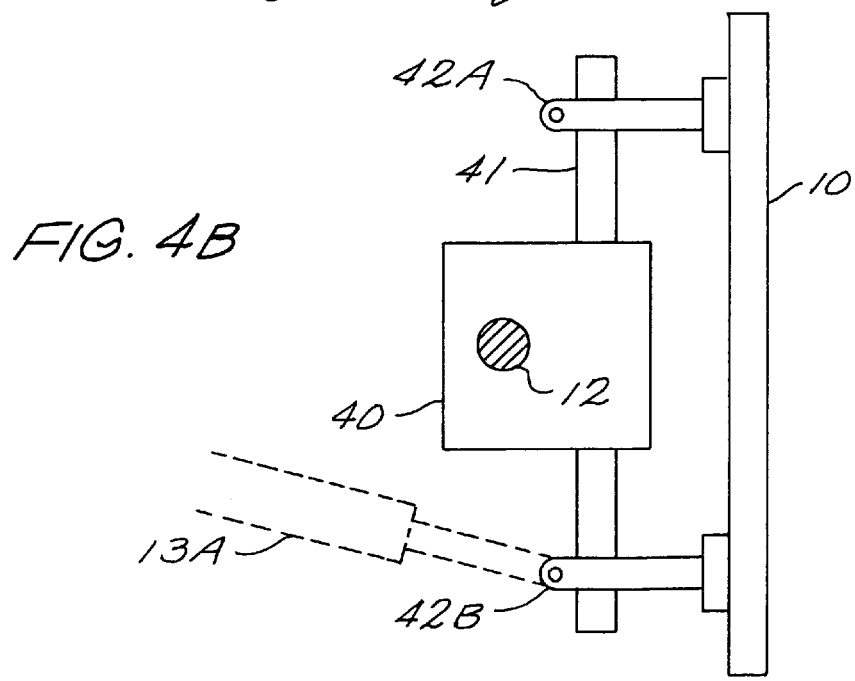

FIGS. 4A and 4B illustrate the preferred connecting block used to secure the lateral and horizontal rods.

Circular rod 12, as described before, extends through connecting block 40 and is secured to mirror frame 10 via clamps 11B and 11C. Circular rod 12 forms a longitudinal axis extending the height of the mirror frame 10. Movement of mirror frame 10 in a tilting motion is accomplished using ram 13B as described before.

Circular rod 41 forms the horizontal axis and is rotationally secured to circular rod 12 via connecting block 40. Circular rod 41 is secured to mirror along mirror frame 10 at lateral points using swivel connectors 42A and 42B. As described before, ram 13A permits the rotation of mirror frame 10.

It is clear from the foregoing that the present invention creates an improved vehicular mirror with adjustment mechanism.

What is claimed is:

1. A vehicular mirror assembly comprising:
   a) a rectangular mirror holder having a slot for placement of a mirror being at least three feet by ten inches, said mirror being positioned on a forward surface thereof, said rectangular mirror holder having on its rear surface, at least two pillow block bearings secured thereto;
   b) a circular rod extending longitudinally through said at least two pillow block bearings and forming thereby a first axis;
   c) a mounting bracket being securable to a vehicle at a first end thereof, a second end of said mounting bracket having two swivel pillow blocks swivelly securing said mounting bracket to said circular rod and forming a second axis being substantially perpendicular to the first axis;
   d) a first ram, a first end thereof secured to said mounting bracket and a second end thereof secured at a lateral position of the rear surface of said rectangular mirror holder, a portion of said first ram being substantially in line with the second axis;
   e) a second ram, a first end thereof secured to said mounting bracket and a second end secured to the circular rod; and,
   f) a manually controlled switch activating said first ram and the second ram.

2. The vehicular mirror assembly according to claim 1, further including:

a) a horizontal circular rod extending horizontally and being swivelly secured to said rectangular mirror holder in line with the second axis; and, b) a block connector swivelly securing said circular rod and the horizontal circular rod to each other.

3. The vehicular mirror assembly according to claim 2, further including a first dampening mechanism, a first end of the first dampening mechanism secured to the mounting bracket, a second end of the first dampening mechanism secured to a lateral position of the rear surface of the rectangular mirror holder.

4. The vehicular mirror assembly according to claim 3, further including a second dampening mechanism, a first end of the second dampening mechanism secured to the mounting bracket, a second end of the second dampening mechanism secured to said circular rod.

5. The vehicular mirror assembly according to claim 4, further including at least two mirrored surfaces contained within the slot on the rectangular mirror holder.

6. The vehicular mirror assembly according to claim 5, wherein one of said at least two mirrored surfaces is convex shaped.

7. The vehicular mirror assembly according to claim 6, wherein one of said at least two mirrored surfaces is substantially planar.

8. The vehicular mirror assembly according to claim 7, wherein the convex shaped mirror surface includes a vibration resistant border adapted to engage the slot on the rectangular mirror holder.

9. The vehicular mirror assembly according to claim 8, further including an inflatable bladder secure to the slot of said rectangular mirror holder such that, when inflated, said inflatable bladder engages said at least two mirrored surfaces.

10. The vehicular mirror assembly according to claim 7, wherein said substantially planar mirror surface is positioned above the convex shaped mirror surface within the slot of the rectangular mirror holder.

11. The vehicular mirror assembly according to claim 10, further including a second convex shaped mirror surface positioned above the substantially planar mirror surface in the slot of the rectangular mirror holder.

12. The vehicular mirror assembly according to claim 7, wherein the substantially planar mirror surface is positioned below the convex shaped mirror surface within the slot of the rectangular mirror holder.

13. A rectangular vehicular mirror assembly comprising:
a) at least two pillow block bearings secured to a back of a rectangular mirror;
b) a longitudinal circular rod extending longitudinally through said at least two pillow block bearings forming a first axis thereby;
c) a horizontal circular rod extending horizontally and being swivelly secured to said rectangular mirror in line with the second axis; and,
d) a block connector swivelly securing said circular rod and the horizontal circular rod to each other;
e) a mounting bracket being securable to a vehicle at a first end thereof, a second end of said mounting bracket being swivelly secured to said longitudinal circular rod;
f) a first ram, a first end thereof secured to the first end of said mounting bracket and a second end thereof secured at a lateral position of the horizontal circular rod;
g) a second ram, a first end thereof secured to the first end of said mounting bracket and a second end secured to said longitudinal circular rod.

14. The rectangular vehicular mirror assembly according to claim 13, further including:
a) a first dampening mechanism, a first end of the first dampening mechanism secured to the mounting bracket, a second end of the first dampening mechanism secured to a lateral position of the horizontal circular rod; and,
b) a second dampening mechanism, a first end of the second dampening mechanism secured to the mounting bracket, a second end of the second dampening mechanism secured to said longitudinal circular rod.

15. The vehicular mirror assembly according to claim 14,
a) wherein said mirror consist of a flat mirrored surface and convex shaped mirrored surface; and,
b) further including a bracket slideably holding said flat mirrored surface and the convex mirrored surface mirror.

16. A vehicular mirror assembly comprising:
a) four pillow block bearings secured to a back of a mirror, said four pillow block bearings arranged in a linear fashion;
b) a circular rod extending longitudinally through said four pillow block bearings forming a first axis;
c) a mounting bracket being securable to a vehicle at a first end thereof, a second end of said mounting bracket being swivelly secured to said circular rod and forming a second axis being substantially perpendicular to the first axis; and,
d) a ram system being remotely activatable, said ram system having,
1) a first ram, a first end thereof secured to said mounting bracket and a second end thereof secured at a lateral position of a rear surface of a rectangular mirror holder such that a portion of said first ram substantially is in line with the first axis, and,
2) second ram, a first end thereof secured to said mounting bracket and a second end secured to circular rod.

17. The vehicular mirror assembly according to claim 16, further including a dampening system comprising:
a) a first dampening mechanism, a first end of the first dampening mechanism secured to the mounting bracket, a second end of the first dampening mechanism secured to the lateral position of the rear surface of the rectangular mirror holder; and,
b) a second dampening mechanism, a first end of the second dampening mechanism secured to the mounting bracket, a second end of the second dampening mechanism secured to said circular rod.

18. The vehicular mirror assembly according to claim 16, further including:
a) a horizontal circular rod extending horizontally and being swivelly secured to said rectangular mirror holder in line with the second axis; and,
b) a block connector swivelly securing said circular rod and the horizontal circular rod to each other.

* * * * *